(12) United States Patent
Sharma et al.

(10) Patent No.: US 12,615,094 B2
(45) Date of Patent: Apr. 28, 2026

(54) PHOTODETECTOR WITH SPLIT INPUTS

(71) Applicant: Cisco Technology, Inc., San Jose, CA (US)

(72) Inventors: Rajat Sharma, Pasadena, CA (US); Fatemeh Rezaeifar Bayat, Mission Viejo, CA (US); Attila Mekis, Carlsbad, CA (US); Gianlorenzo Masini, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 375 days.

(21) Appl. No.: 18/302,360

(22) Filed: Apr. 18, 2023

(65) Prior Publication Data

US 2024/0356656 A1     Oct. 24, 2024

(51) Int. Cl.
*H04B 10/67* (2013.01)
*G02B 6/12* (2006.01)

(52) U.S. Cl.
CPC ......... *H04B 10/67* (2013.01); *G02B 6/12016* (2013.01); *G02B 2006/12035* (2013.01); *G02B 2006/12159* (2013.01)

(58) Field of Classification Search
CPC .................................................... H04B 10/67
See application file for complete search history.

(56) References Cited

U.S. PATENT DOCUMENTS

| | | | |
|---|---|---|---|
| 10,613,274 B2 | 4/2020 | Sahni et al. | |
| 11,067,765 B2 | 7/2021 | Gothoskar et al. | |
| 11,217,710 B2 | 1/2022 | Hon et al. | |
| 2007/0152225 A1* | 7/2007 | Ooi ........................ | H01S 5/1057 257/E33.054 |
| 2008/0031633 A1 | 2/2008 | Hoshida et al. | |
| 2009/0003841 A1 | 1/2009 | Ghidini et al. | |
| 2011/0217040 A1 | 9/2011 | Mori | |
| 2014/0248019 A1* | 9/2014 | Witzens ................ | G02F 1/2255 385/2 |
| 2017/0019181 A1 | 1/2017 | Flintham et al. | |
| 2022/0149954 A1 | 5/2022 | Li et al. | |
| 2024/0176170 A1* | 5/2024 | Park ........................ | G02F 1/025 |

OTHER PUBLICATIONS

U.S. Appl. No. 17/816,255, filed Jul. 29, 2022.

* cited by examiner

*Primary Examiner* — David C Payne

(74) *Attorney, Agent, or Firm* — Patterson + Sheridan, LLP

(57)     ABSTRACT

The present disclosure describes photodetectors with multiple inputs and methods of operating photodetectors with multiple inputs. An apparatus includes a substrate, an optical absorber, and an optical device. The optical absorber is positioned on the substrate. The optical absorber includes a first portion and a second portion coupled to the first portion along a line. The optical device produces a first optical signal and a second optical signal based on a received optical signal and directs the first optical signal through the first portion of the optical absorber in a direction substantially parallel to the line. The optical device also directs the second optical signal through the second portion of the optical absorber in the direction substantially parallel to the line.

18 Claims, 14 Drawing Sheets

100

900

Start

Produce a first optical signal and a second optical signal ⌒902

Direct first optical signal through optical absorber ⌒904

Direct second optical signal through optical absorber ⌒906

End

1400

PHOTODETECTOR WITH SPLIT INPUTS

TECHNICAL FIELD

Embodiments presented in this disclosure generally relate to photodetectors. More specifically, embodiments disclosed herein include a photodetector with split inputs.

BACKGROUND

Photodetectors convert optical signals into electrical signals. The photodetectors may include an optical absorber through which optical signals pass. The optical signals separate electrical carriers in the optical absorber, generating electrical signals.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
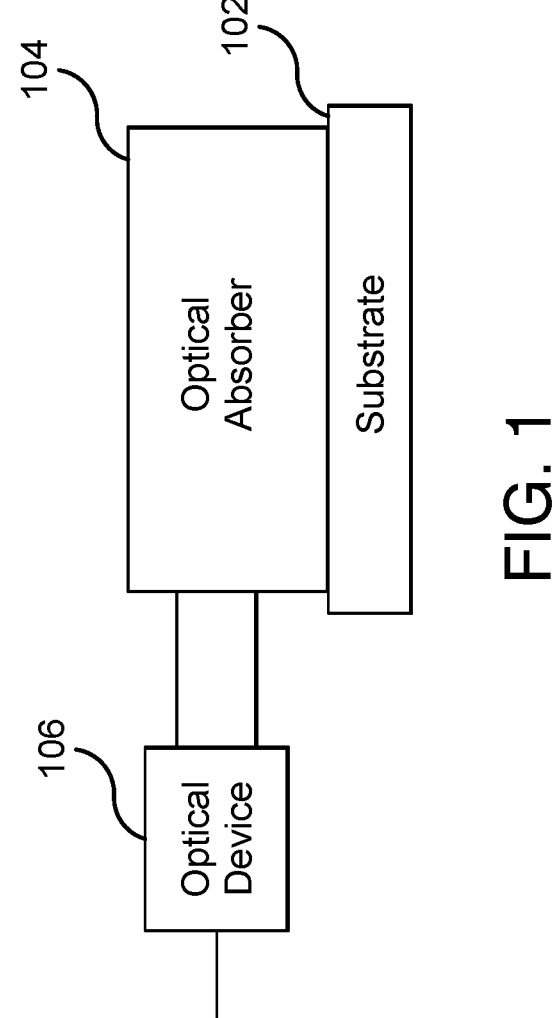
FIG. 1 illustrates an example system.

The present disclosure describes photodetectors with multiple inputs and methods of operating photodetectors with multiple inputs. According to an embodiment, an apparatus includes a substrate, an optical absorber, and an optical device. The optical absorber is positioned on the substrate.

The optical absorber includes a first portion and a second portion coupled to the first portion along a line. The optical device produces a first optical signal and a second optical signal based on a received optical signal and directs the first optical signal through the first portion of the optical absorber in a direction substantially parallel to the line. The optical device also directs the second optical signal through the second portion of the optical absorber in the direction substantially parallel to the line.

According to another embodiment, a method includes producing, by an optical device, a first optical signal and a second optical signal based on a received optical signal and directing the first optical signal through a first portion of an optical absorber in a direction substantially parallel to a line. The method also includes directing the second optical signal through a second portion of the optical absorber in the direction substantially parallel to the line. The second portion is coupled to the first portion along the line.

According to another embodiment, an apparatus includes an optical absorber and an optical device. The optical absorber includes a first set of metal contacts arranged along a first side of the optical absorber, a second set of metal contacts arranged along a second side of the optical absorber opposite the first side, and a third set of metal contacts arranged along a line. The optical device produces a first optical signal and a second optical signal and directs the first optical signal through a first portion of the optical absorber between the first set of metal contacts and the third set of metal contacts in a direction substantially parallel to the line. The optical device also directs the second optical signal through a second portion of the optical absorber between the second set of metal contacts and the third set of metal contacts in the direction substantially parallel to the line.

EXAMPLE EMBODIMENTS

Photodetectors convert optical signals into electrical signals. The photodetectors may include an optical absorber (e.g., a germanium on silicon optical absorber) through which optical signals pass. The optical signals create free electrical carriers (e.g., electrons and holes) in the optical absorber, generating electrical signals. Some photodetectors include metal contacts on a top surface of the optical absorber. These metal contacts may interact with optical signals passing through the optical absorber beneath the metal contacts, resulting in responsivity loss. Additionally, the optical absorber may reflect some of the optical signals, which can create interference and degrade link performance.

The present disclosure describes a photodetector with multiple inputs. An optical device produces two optical signals from a received optical signal. The optical device then couples the two optical signals into the two different halves of the optical absorber. In this manner, the two optical signals are directed through the optical absorber but away from the metal contacts along a line (e.g., a midline) and on the top surface of the optical absorber. As a result, the metal contacts interfere less with the optical signals passing through the optical absorber, which reduces responsivity loss in certain embodiments.

In some embodiments, a tuner is included to adjust the phases of the two optical signals entering the optical absorber. The optical device may receive an input optical signal at an input port and produce the two optical signals from the input optical signal. The tuner may adjust the phases of the two optical signals so that the reflected signals from the optical absorber destructively interfere with each other at the input port. In this manner, the interference at the input port caused by the reflected signals is reduced, which improves link performance in certain embodiments.

FIG. 1 illustrates an example system 100. As seen in FIG. 1, the system 100 includes a substrate 102, an optical absorber 104, and an optical device 106. Generally, the optical device 106 produces optical signals that are input into the optical absorber 104. The optical absorber 104 converts the optical signals into electrical signals.

The substrate 102 provides a structural foundation for other components of the system 100. For example, the substrate 102 may provide a structural foundation for the optical absorber 104 and/or the optical device 106. The substrate 102 may be formed using a semiconductor material (e.g., silicon). Portions of the substrate 102 may be doped to allow for electrical conduction through portions of the substrate 102.

The optical absorber 104 may be positioned on the substrate 102. In certain embodiments, the optical absorber 104 is a germanium optical absorber. The optical absorber 104 may include doped regions through which electrical carriers may flow. When an optical signal passes through the optical absorber 104, the optical signal may generate pairs of positively and negatively charged electrical carriers. The electric field in the optical absorber 104 may direct the positively charged carriers and the negatively charged carriers to different portions of the optical absorber 104, which creates an electrical signal. The magnitude of the electrical signal may depend on the optical power of the optical signal passing through the optical absorber 104. In this manner, the optical absorber 104 converts an optical signal into an electrical signal.

The optical device 106 produces optical signals that are input to the optical absorber 104. For example, the optical device 106 may receive an input optical signal and produce multiple optical signals from the input optical signal. The optical device 106 then directs the multiple optical signals into the optical absorber 104. The optical absorber 104 may convert the multiple optical signals into electrical signals. In certain embodiments, the optical device 106 may direct the multiple optical signals into different portions of the optical absorber 104. For example, the optical device 106 may direct the optical signals through different halves or sides of the optical absorber 104. In this manner, the optical signals are directed through the optical absorber 104 and away from metal contacts arranged along a midline and on the top surface of the optical absorber 104. As a result, interference caused by these metal contacts on the optical signals is reduced, in certain embodiments.

Figure 2:
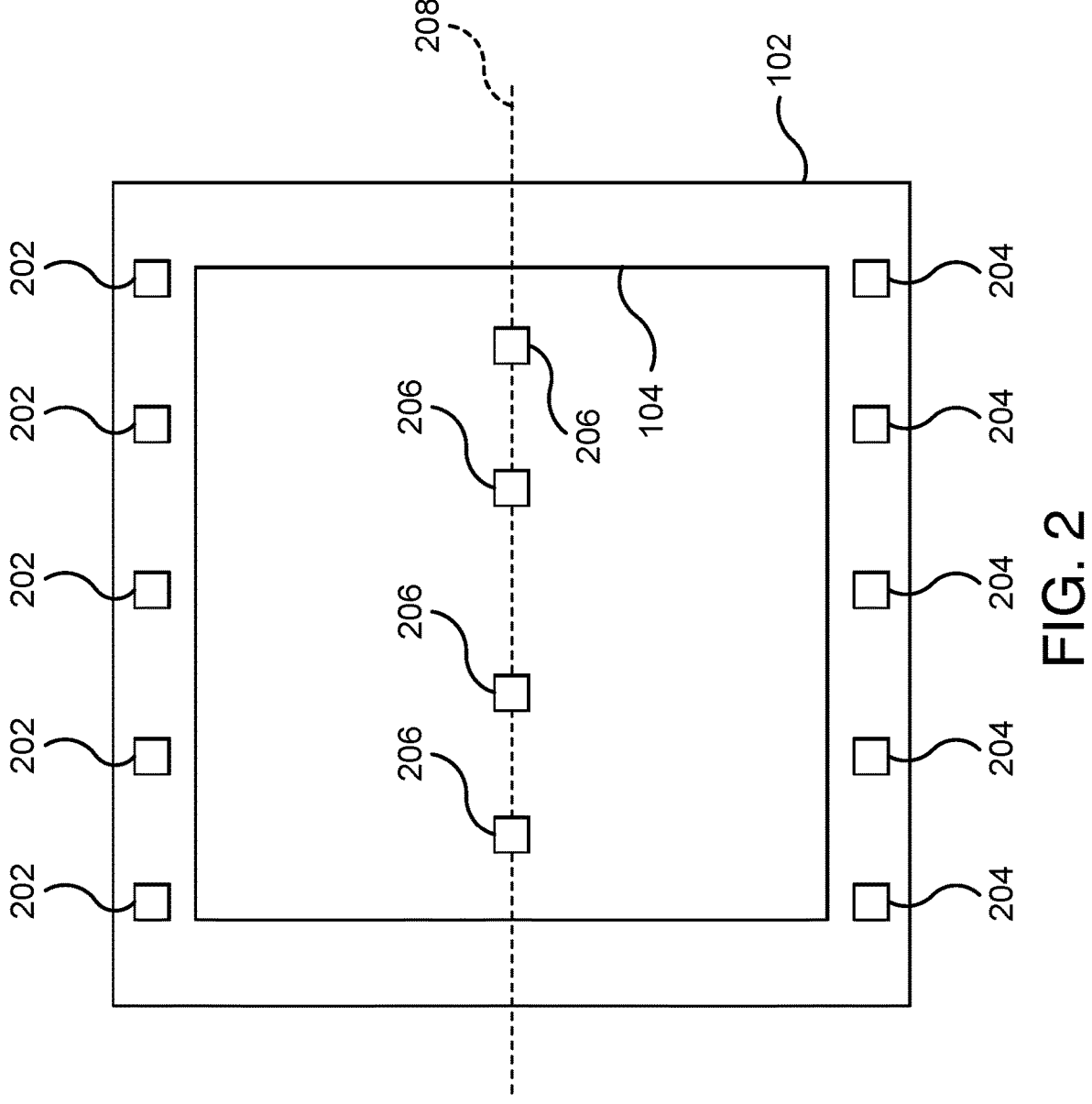
FIG. 2 illustrates an example optical absorber in the system of FIG. 1.

FIG. 2 illustrates an example optical absorber 104 in the system 100 of FIG. 1. Generally, FIG. 1 shows a top-down view of the optical absorber 104. As seen in FIG. 2, the optical absorber 104 is positioned on the substrate 102. Additionally, metal contacts 202, 204, and 206 are arranged on the optical absorber 104 or the substrate 102. The metal contacts 202 are arranged on the substrate 102 along a side of the optical absorber 104. The metal contacts 204 are arranged on the substrate 102 and along a side of the optical absorber 104. The metal contacts 202 are arranged along an opposite side of the optical absorber 104 as the metal contacts 204. The metal contacts 206 are arranged on the optical absorber 104. Specifically, the metal contacts 206 are arranged along a midline 208 of the optical absorber 104. The metal contacts 206 may be arranged in parallel with the metal contacts 202 and 204. As a result, the metal contacts 206 are positioned along the midline 208 on the top surface of the optical absorber 104. The metal contacts 206 may cause interference in optical signals that pass through the optical absorber 104 beneath the metal contacts 206.

Figure 3:
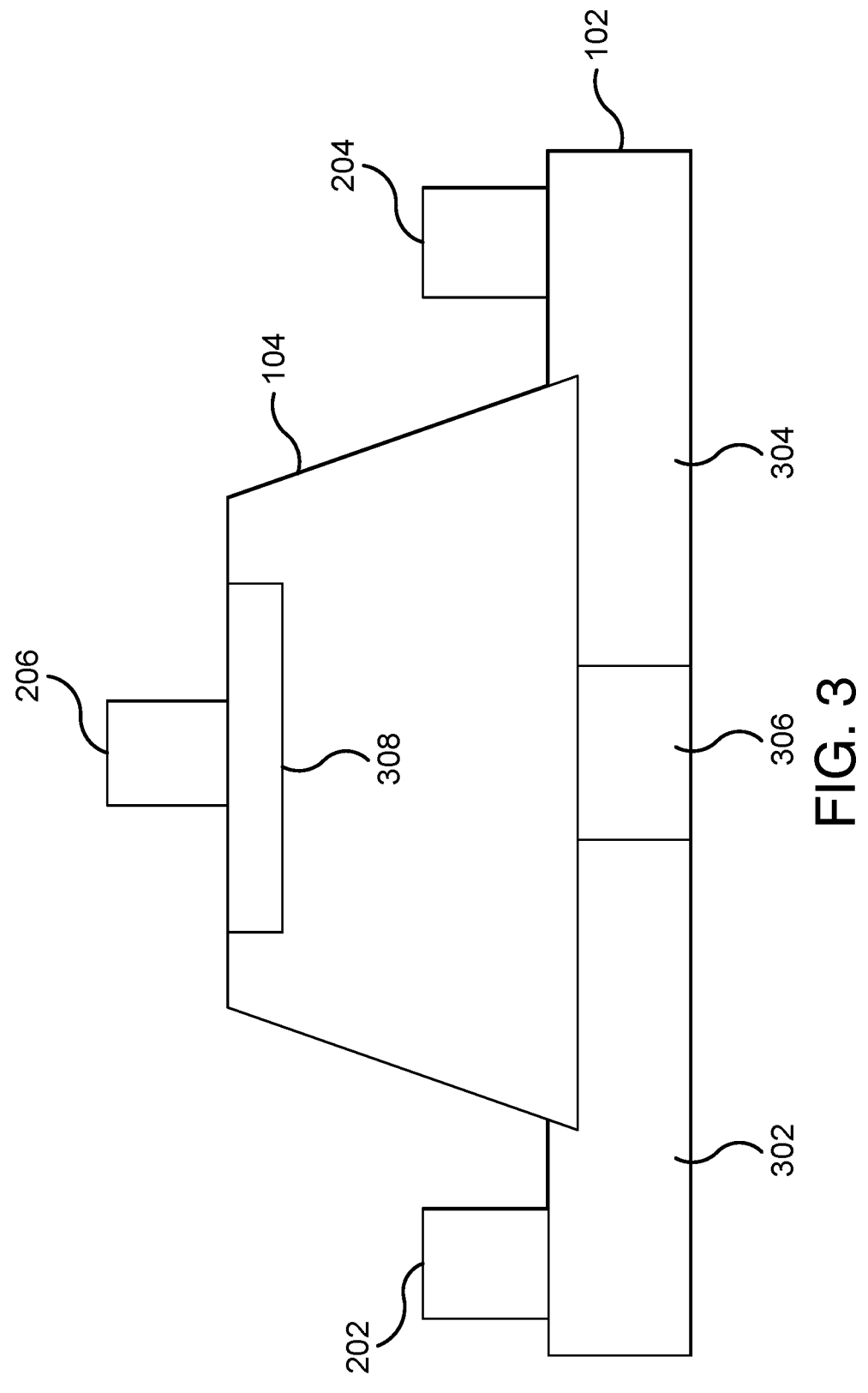
FIG. 3 illustrates an example optical absorber in the system of FIG. 1.

FIG. 3 illustrates an example optical absorber 104 in the system 100 of FIG. 1. Generally, FIG. 3 shows a front or cross-sectional view of the optical absorber 104. As seen in FIG. 3, the optical absorber 104 is positioned on the substrate 102. The metal contacts 202 and 204 are formed on the substrate 102 on opposite sides of the optical absorber 104. Additionally, the metal contacts 206 are formed on the top surface of the optical absorber 104.

The substrate 102 includes doped regions 302 and 304 on opposite ends of the substrate 102. The doped regions 302 and 304 may extend beneath the optical absorber 104 and the metal contacts 202 and 204. The metal contacts 202 may be formed on the doped region 302, and the metal contacts 204 may be formed on the doped region 304. The substrate 102 may include an undoped or intrinsic region 306 positioned between the doped regions 302 and 304. The undoped or intrinsic region 306 may be positioned beneath the optical absorber 104. As a result, the undoped or intrinsic region 306 may provide electrical isolation between the doped regions 302 and 304. In some embodiments, the region 306 is counter-doped, instead of being undoped or intrinsic.

The optical absorber 104 may include a doped region 308 positioned along the top surface of the optical absorber 104. The doped region 308 may be positioned beneath the metal contacts 206. The doped region 308 may have an opposite doping relative to the doped regions 302 and 304 of the substrate 102. In certain embodiments, the optical absorber 104 includes germanium, and the doped region 308 may include doped germanium.

When an optical signal passes through the optical absorber 104, the optical signal may generate positive and negative carriers in the optical absorber 104. The electric field in the optical absorber 104 may direct the positive and negative carriers to different portions of the optical absorber 104. For example, the electric field in the optical absorber 104 may direct the positive carriers to the doped regions 302 and 304 and the negative carriers to the doped region 308. The positive carriers may then be directed to the metal contacts 202 and 204, while the negative carriers are directed to the metal contacts 206. As another example, the optical absorber 104 may direct negative carriers to the doped regions 302 and 304 and the positive carriers to the doped region 308. The negative carriers are then directed to the metal contacts 202 and 204, while the positive carriers are directed to the metal contact 206. In this manner, the optical absorber 104 converts the optical signal into an electrical signal.

Figure 4:
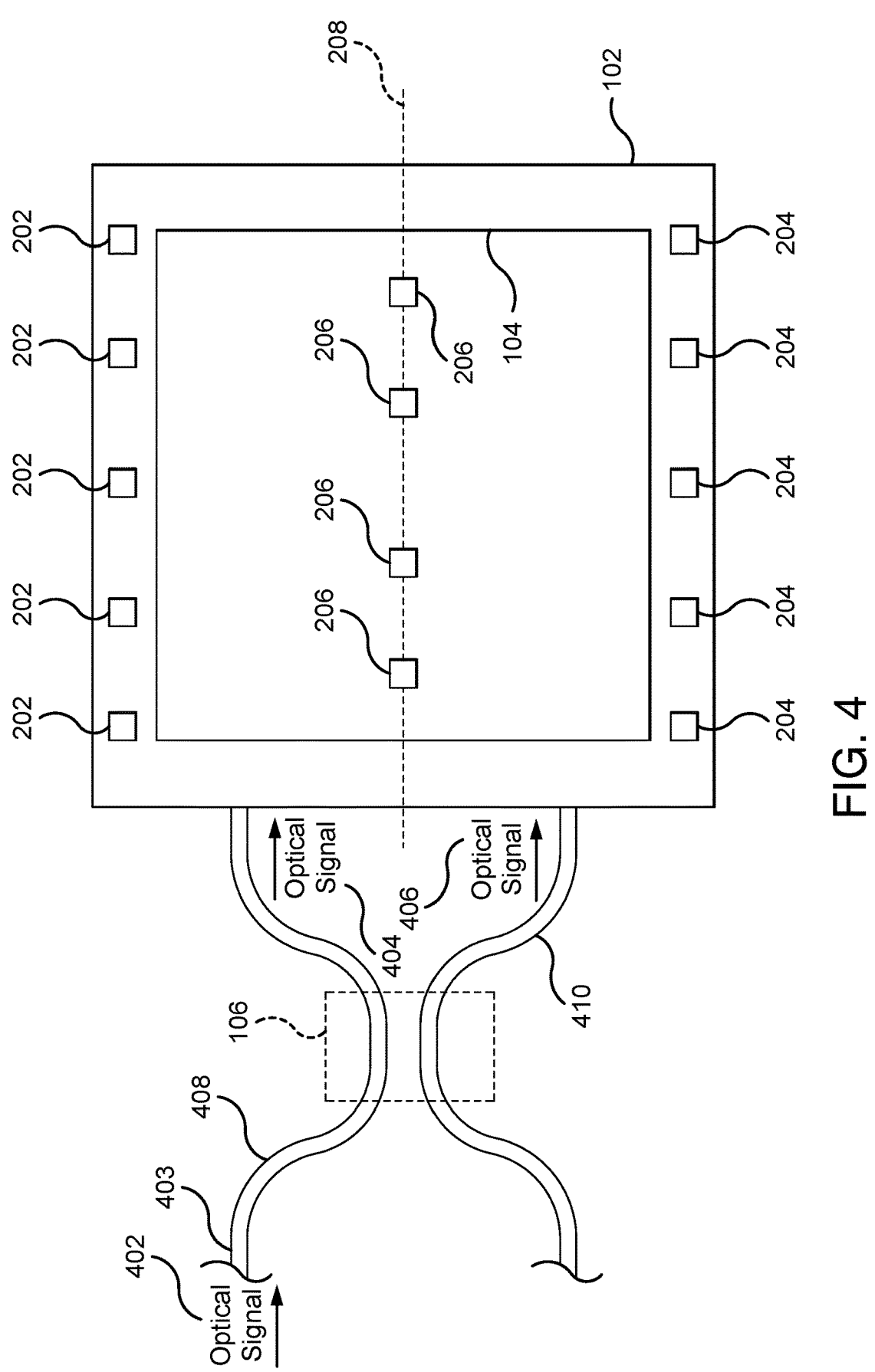
FIG. 4 illustrates an example implementation of the system of FIG. 1.

FIG. 4 illustrates an example implementation of the system 100 of FIG. 1. In the example of FIG. 4, the optical device 106 is a directional coupler. An optical signal 402 enters the directional coupler at an input port 403. The directional coupler may produce optical signals 404 and 406 using the optical signal 402. For example, part of the optical signal 402 may travel through a portion 408 of the directional coupler to form the optical signal 404. Part of the optical signal 402 may evanescently couple to another portion 410 of the directional coupler to form the optical signal 406. The directional coupler may impart a 90-degree phase offset to the portion of the optical signal 402 that evanescently couples to the portion 410 of the directional coupler to form the optical signal 406. The directional coupler directs the optical signal 404 and the optical signal 406 to the optical absorber 104. For example, the directional coupler may abut the substrate 102 and direct the optical signals 404 and 406 into the substrate 102. The optical signals 404 and 406 may then travel into the optical absorber 104 from the substrate 102. As another example, the directional coupler may abut the optical absorber 104, and the optical signals 404 and 406 may couple into the optical absorber 104 from the directional coupler.

Figure 5:
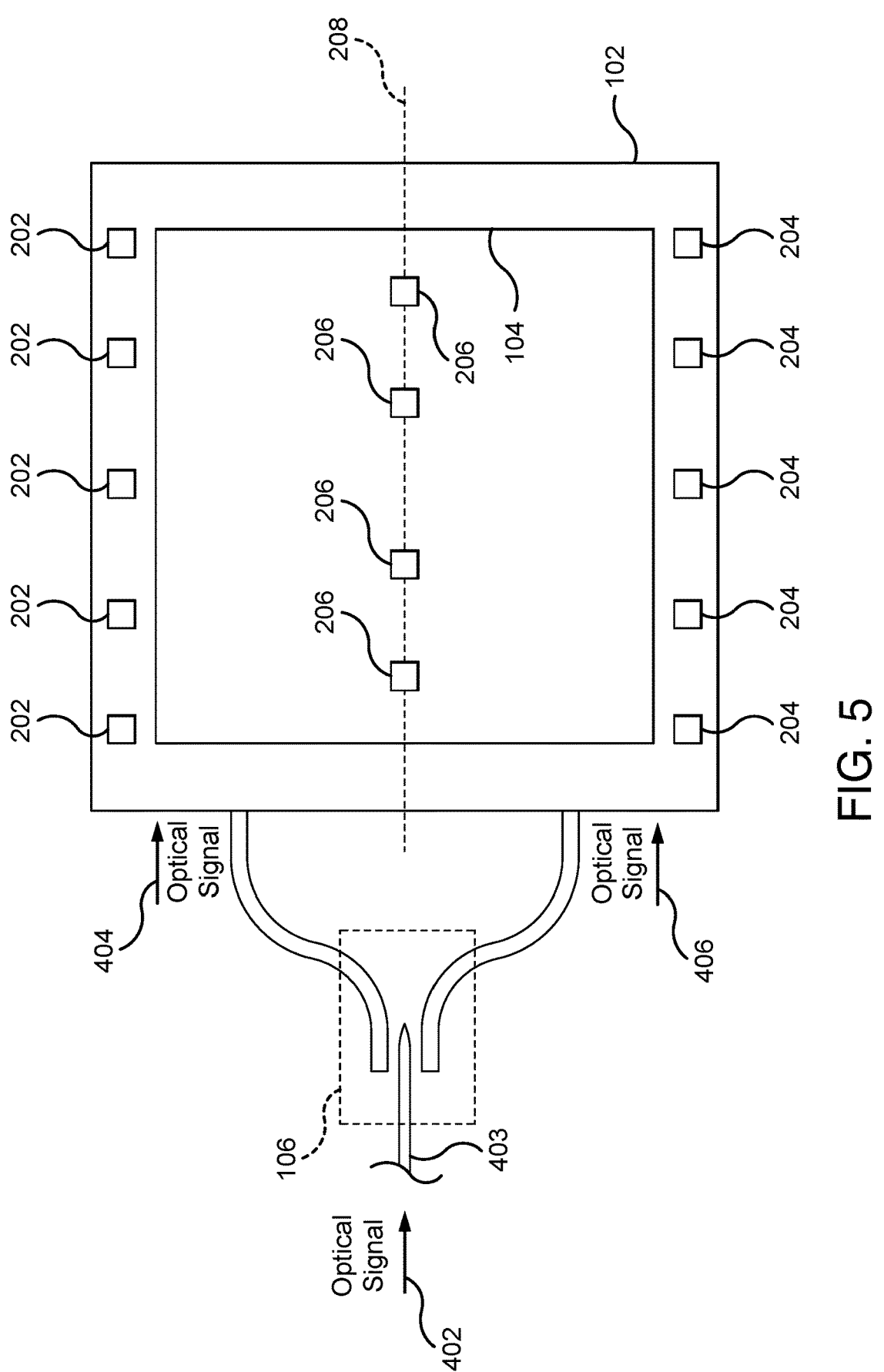
FIG. 5 illustrates an example implementation of the system of FIG. 1.

FIG. 5 illustrates an example implementation of the system 100 of FIG. 1. In the example of FIG. 5 the optical device 106 is a Y-splitter. The Y-splitter receives the optical signal 402 at an input port 403 of the Y-splitter. The Y-splitter then splits the optical signal 402 to form the optical signal 404 and the optical signal 406. The Y-splitter directs the optical signals 404 and 406 to the optical absorber 104. For example, the Y-splitter may abut the substrate 102 and direct the optical signals 404 and 406 into the substrate 102. The optical signals 404 and 406 may then travel into the optical absorber 104 from the substrate 102. As another example, the Y-splitter may abut the optical absorber 104 and direct the optical signals 404 and 406 into the optical absorber 104.

Figure 6:
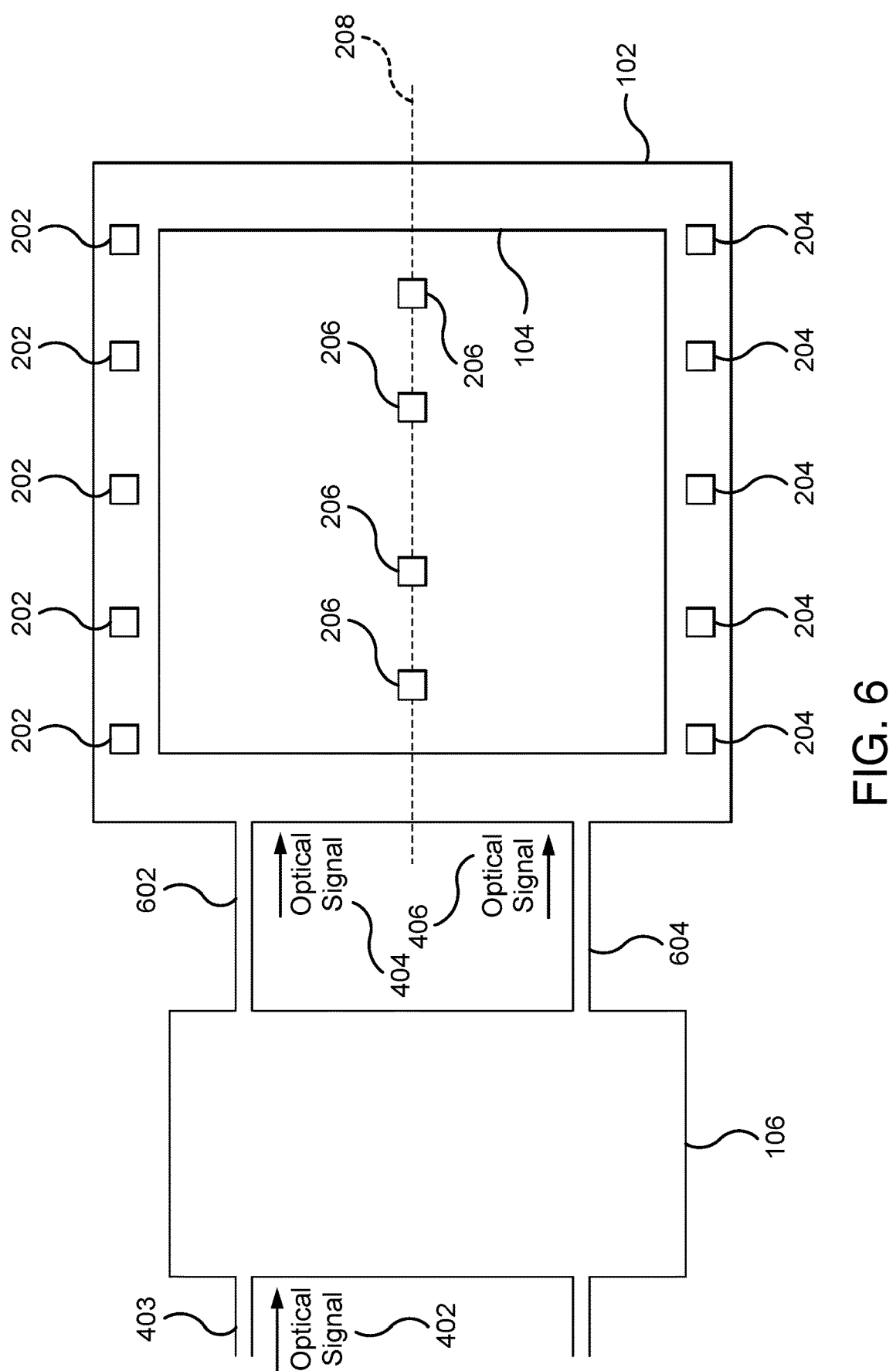
FIG. 6 illustrates an example implementation of the system of FIG. 1.

FIG. 6 illustrates an example implementation of the system 100 of FIG. 1. As seen in FIG. 6, the optical device 106 may be a multi-mode interferometer (MMI). The MMI receives the optical signal 402 at an input port 403 of the MMI. Generally, the MMI acts as a broad optical waveguide that directs portions of the optical signal 402 to different output ports 602 and 604 of the MMI. The MMI produces the optical signals 404 and 406 using the optical signal 402. The MMI directs the optical signal 404 through one output port 602 and the optical signal 406 through another output port 604. The MMI directs the optical signals 404 and 406 to the optical absorber 104. For example, the MMI may abut the substrate 102 and direct the optical signals 404 and 406 into the substrate 102. The optical signals 404 and 406 may then travel into the optical absorber 104 from the substrate 102. As another example, the MMI may abut the optical absorber 104 and direct the optical signals 404 and 406 into the optical absorber 104. In some embodiments, the MMI may introduce phase offsets (e.g., the same or different phase offsets) into the optical signals 404 and 406 when producing the optical signals 404 and 406.

Figure 7:
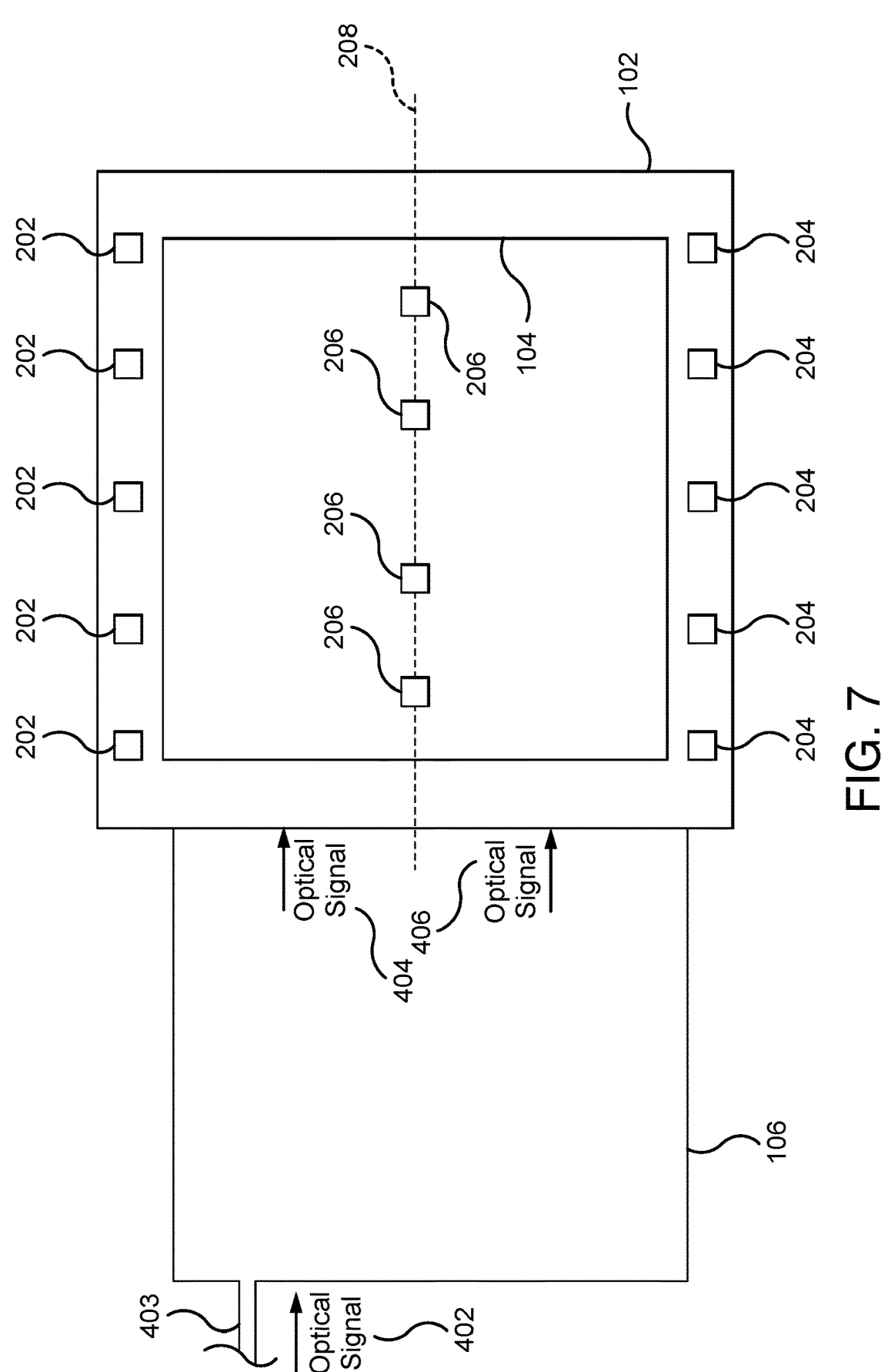
FIG. 7 illustrates an example implementation of the system of FIG. 1.

FIG. 7 illustrates an example implementation of the system 100 of FIG. 1. In the example of FIG. 7, the optical device 106 uses single mode offset excitation to produce the optical signals 404 and 406 using the optical signal 402. The input port 403 of the optical device 106 may be offset from being aligned with the midline 208 of the optical absorber 104. The offset may excite different optical modes in different regions of the optical device 106, which produces the optical signals 404 and 406. The optical device 106 may abut the optical absorber 104 and direct the optical signals 404 and 406 into the optical absorber 104. The optical device 106 directs the optical signals 404 and 406 to the optical absorber 104. In some embodiments, the optical device 106 includes only the input port 403. The input port 403 directly abuts the substrate 102 or the optical absorber 104. The input port 403 may be offset from the midline 208 of the optical absorber 104 such that a fundamental mode of the optical signal 402 is directed into the optical absorber 104.

Figure 8:
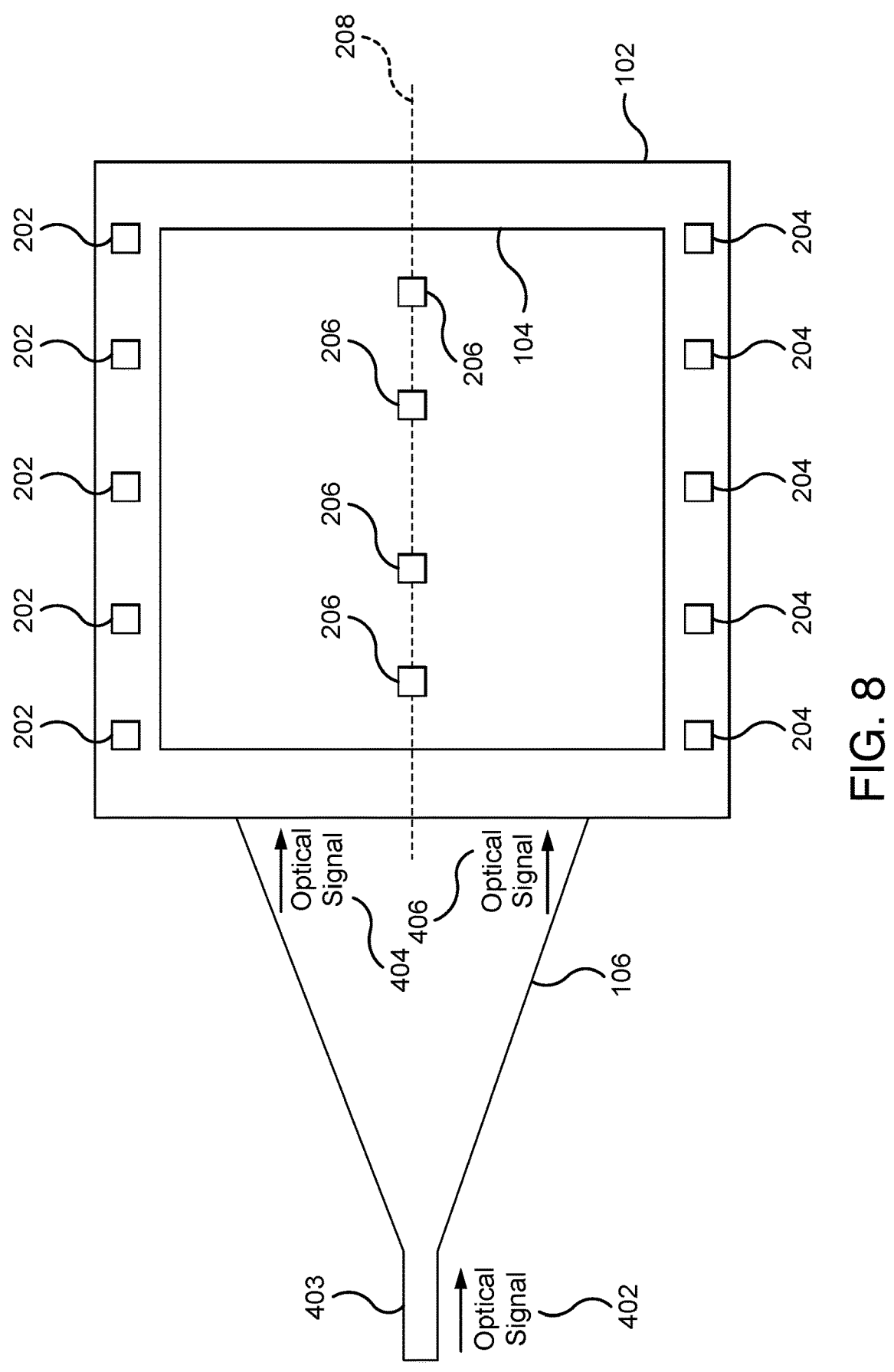
FIG. 8 illustrates an example implementation of the system of FIG. 1.

FIG. 8 illustrates an example implementation of the system 100 of FIG. 1. In the example of FIG. 8, the optical device 106 uses single-input odd-mode excitation to produce the optical signals 404 and 406 using the optical signal 402. The input port 403 of the optical device 106 may be aligned with the midline 208 of the optical absorber 104. The optical device 106 may fan out or increase in width closer to the optical absorber 104. As a result, the optical device may excite different optical modes in different portions of the optical device 106 to produce the optical signals 404 and 406. The optical device 106 may abut the optical absorber 104 and direct the optical signals 404 and 406 into the optical absorber 104.

As seen in the examples of FIGS. 4, 5, 6, 7, and 8, the optical device 106 directs the optical signals 404 and 406 to different portions of the optical absorber 104. Specifically, the optical device 106 directs the optical signal 404 through a first half of the optical absorber 104 and the optical signal 406 through a second half of the optical absorber 104. The first half of the optical absorber 104 may be positioned on one side of the midline 208 between the metal contacts 202 and 206. The second half of the optical absorber 104 may be positioned on an opposite side of the midline 208 between the metal contacts 204 and 206. The optical signals 404 and 406 may pass through their respective halves of the optical absorber 104 in a direction substantially parallel to the midline 208. The optical signals 404 and 406 may be traveling in a direction substantially parallel to the midline 208 if the optical signals 404 and 406 are within ten degrees alignment of the midline 208 or if the optical signals 404 and 406 propagate through the optical absorber 104 without intersecting the midline 208. The optical signals 404 and 406 pass through the optical absorber 104 away from the metal contacts 206. For example, the optical signals 404 and 406 may avoid passing directly beneath the metal contacts 206. As a result, the interference caused by the metal contacts 206 on the optical signals 404 and 406 is reduced relative to an optical signal that passes directly beneath the metal contacts 206. Thus, the responsivity loss of the optical absorber 104 is reduced in certain embodiments.

In the examples of FIGS. 4, 5, and 6, the optical signals 404 and 406 may be 180 degrees out of phase with one another, which causes the optical signals 404 and 406 to destructively interfere with each other along the midline 208 of the optical absorber 104. For example, an additional 90-degree phase shift may be introduced (e.g., using a phase shifter) to the optical signal 406 when the optical device 106 is a directional coupler. As another example, a 180-degree phase shift may be introduced (e.g., using a phase shifter) to the optical signal 406 when the optical device 106 is a Y-splitter. As another example, when the optical device 106 is a MMI, the MMI may introduce 90-degree offsets into the optical signals 404 and 406. In the examples of FIGS. 7 and 8, the optical device 106 may direct the optical signals 404 and 406 into the optical absorber such that there is a null-crossing (e.g., destructive interference) along the midline 208.

Additionally, the optical signals 404 and 406 are directed through the optical absorber 104 closer to the metal contacts 202 and 204, respectively, relative to when an optical signal is directed through the optical absorber 104 along the midline 208. As a result, the carriers generated by the optical signals 404 and 406 may travel a shorter distance to reach the metal contacts 202 and 204, which improves the frequency response or speed of the optical absorber 104 in certain embodiments.

Figure 9:
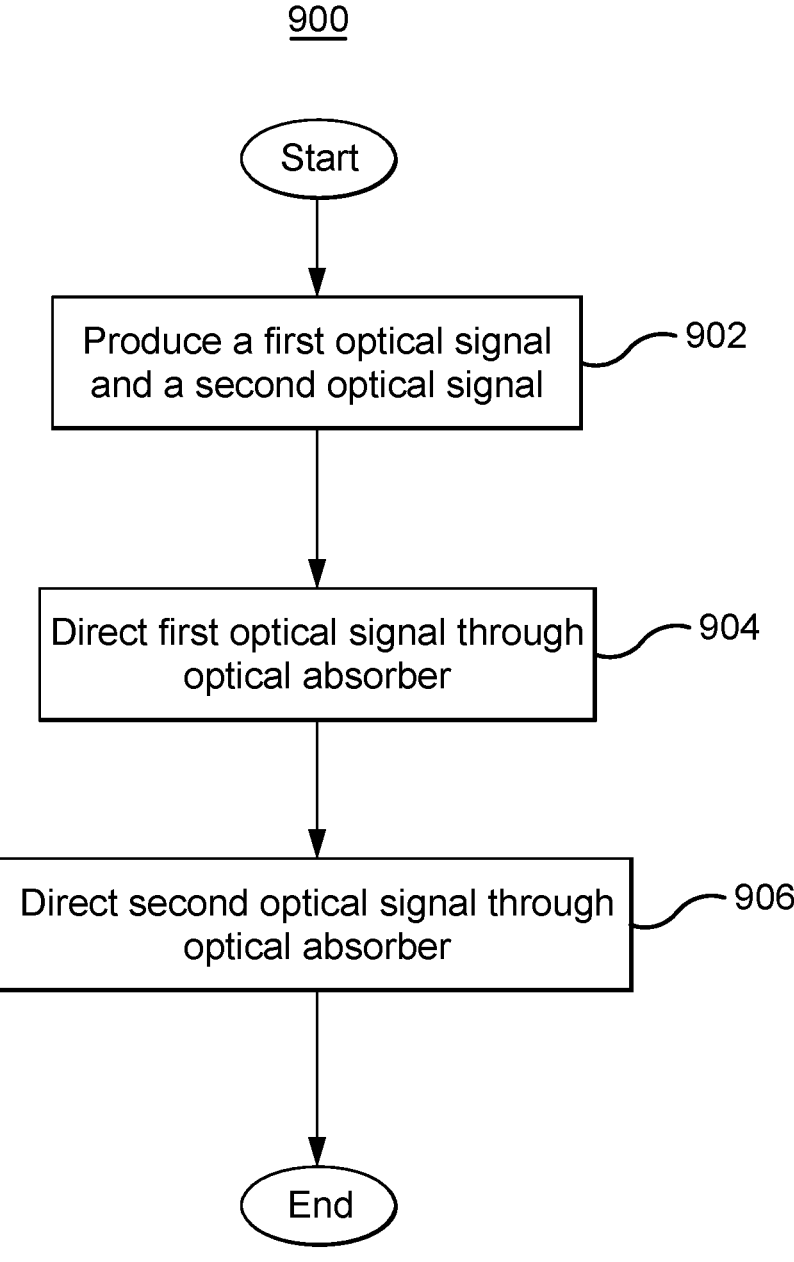
FIG. 9 is a flowchart of an example method performed in the system of FIG. 1.

FIG. 9 is a flowchart of an example method 900 performed in the system 100 of FIG. 1. In particular embodiments, the optical device 106 performs the method 900. By performing the method 900, the optical device 106 directs the optical signals 404 and 406 through different portions of the optical absorber 104 so that the optical signals 404 and 406 avoid passing directly beneath the metal contacts 206.

In block 902, the optical device 106 produces the first optical signal 404 and the second optical signal 406. The optical device 106 may produce the optical signals 404 and 406 using an input optical signal 402. The optical device 106 may use any suitable technique to produce the optical signals 404 and 406. For example, the optical device 106 may be a directional coupler, a Y-splitter, or a MMI that produces the optical signals 404 and 406 using the input optical signal 402. As another example, the optical device 106 may use single mode offset excitation or single-input odd-mode excitation to produce the optical signals 404 and 406 using the input optical signal 402.

At block 904, the optical device 106 directs the first optical signal 404 through the optical absorber 104. In block 906, the optical device 106 directs the second optical signal 406 through the optical absorber 104. The optical device 106 may direct the optical signal 404 and the optical signal 406 through different portions of the optical absorber 104. For example, the optical device 106 may direct the optical signal 404 through a first half of the optical absorber 104 positioned between the metal contacts 202 and the metal contacts 206. The optical device 106 may direct the optical signal 406 through a second half of the optical absorber 104 positioned between the metal contacts 204 and the metal contacts 206. As a result, the optical signals 404 and 406 pass through the optical absorber 104 in a direction substantially parallel to the midline 208 away from the metal contacts 206. In this manner, the interference caused by the metal contacts 206 on the optical signals 404 and 406 is reduced relative to an optical signal that passes directly beneath the metal contacts 206. Thus, the responsivity loss of the optical absorber 104 is reduced in certain embodiments.

Figure 10:
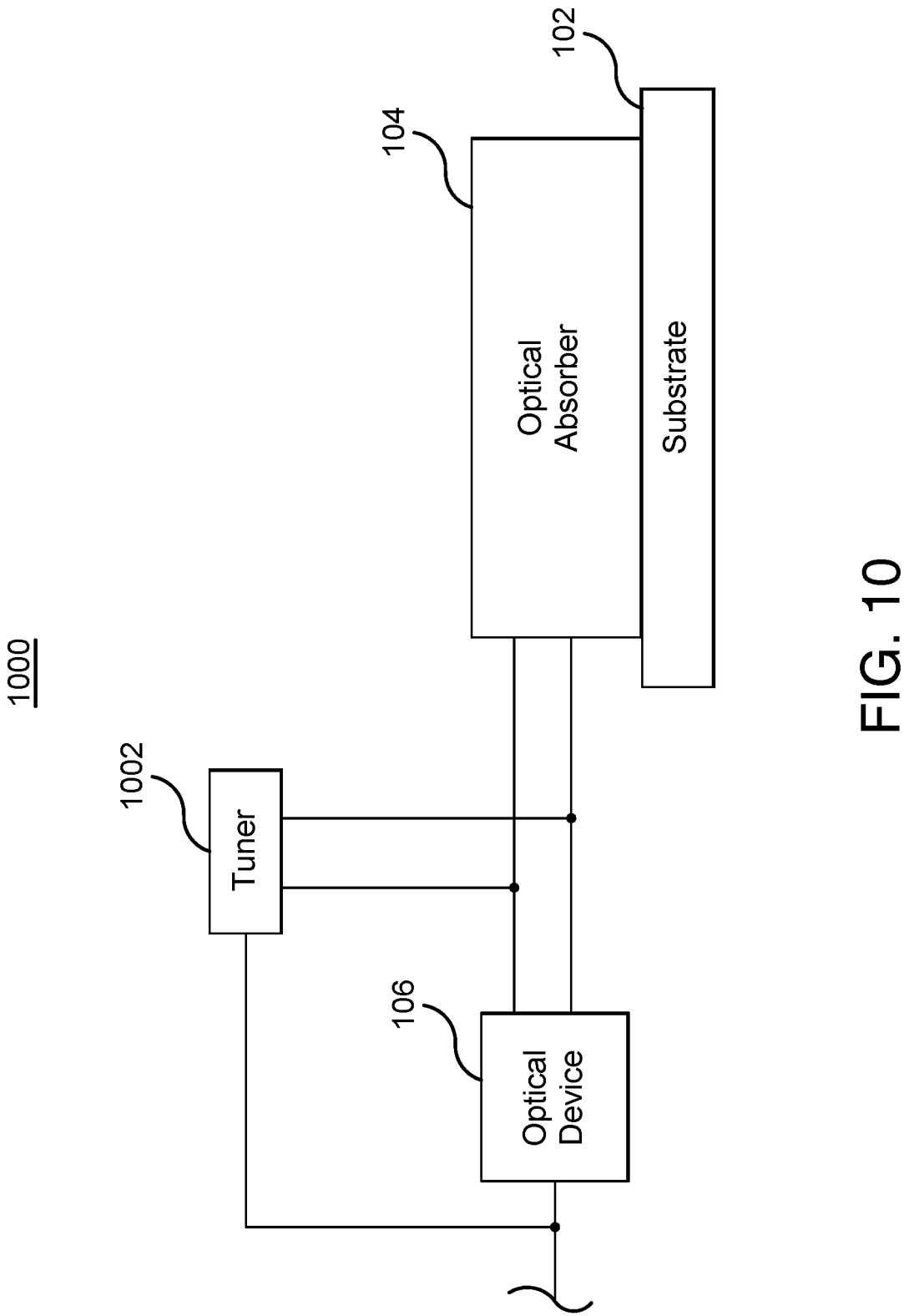
FIG. 10 illustrates an example system.

FIG. 10 illustrates an example system 1000. As seen in FIG. 10, the system 1000 includes the substrate 102, the optical absorber 104, the optical device 106, and a tuner 1002. Generally, the tuner 1002 adjusts phases of optical signals entering the optical absorber 104 so that reflected signals from the optical absorber 104 destructively interfere with each other.

The substrate 102, optical absorber 104, and optical device 106 operate similarly as these components did in the system 100. For example, the substrate 102 provides a structural foundation for other components of the system 1000. The optical absorber 104 may convert optical signals into electrical signals. The optical device 106 may produce optical signals for the optical absorber 104.

In some instances, the optical absorber 104 may reflect back some of the optical signals entering the optical absorber 104. These reflected optical signals may travel back towards the optical device 106, causing interference (e.g., multi-path interference) and link degradation. The tuner 1002 may adjust the phases of the optical signals entering the optical absorber 104 so that the reflected optical signals destructively interfere with each other in the optical device 106. The destructive interference may reduce the interference caused by the reflected signals, which improves link performance in certain embodiments. The tuner 1002 may use any suitable technique to adjust the phases of the optical signals. For example, the tuner 1002 may apply pressure to waveguides carrying the optical signals (which may adjust a physical dimension of the waveguides) to adjust the phase of the optical signals. As another example, the tuner 1002 may apply thermal energy to the waveguides carrying the optical signals to adjust the phases of the optical signals. As yet another example, the tuner 1002 may inject, accumulate, or deplete carriers in the waveguides to adjust the phases of the optical signals.

Figure 11:
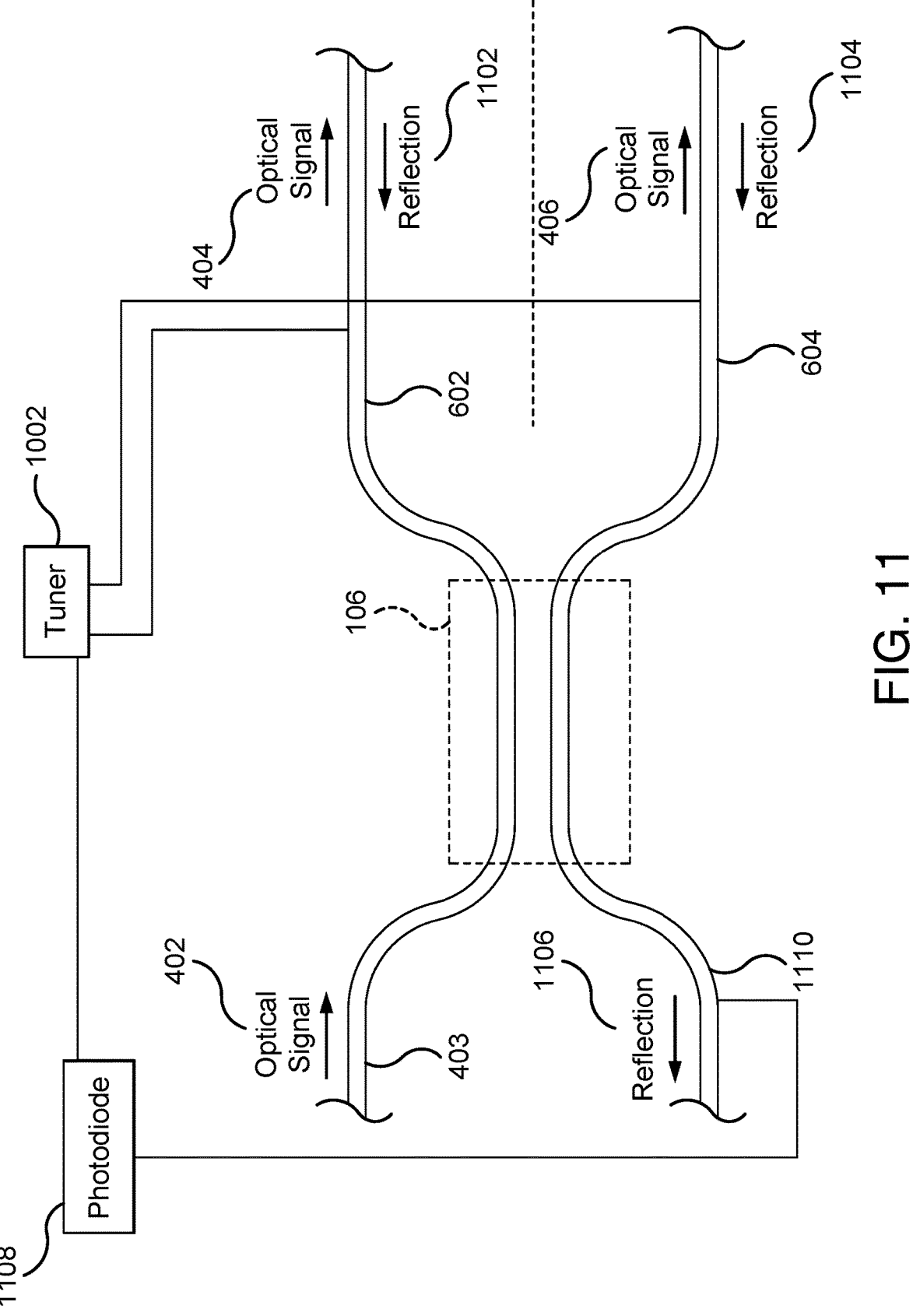
FIG. 11 illustrates an example implementation of the system of FIG. 10.

FIG. 11 illustrates an example implementation of the system 1000 of FIG. 10. For clarity, the substrate 102 and the optical absorber 104 are not illustrated in the implementation of FIG. 11. As seen in FIG. 11, the optical device 106 is a directional coupler that generates the optical signals 404 and 406 using the input optical signal 402. The input optical signal 402 enters the directional coupler at a first input port 403 of the directional coupler. The optical signals 404 and 406 exit the directional coupler through two different output ports 602 and 604 of the directional coupler formed by two different waveguides.

The optical absorber 104 may reflect portions of the optical signals 404 and 406 back into the directional coupler. In the example of FIG. 11, the reflection 1102 is reflected back into the first output port 602 of the directional coupler, and the reflection 1104 is reflected back into the second output port 604 of the directional coupler. The tuner 1002 may adjust the phases of the optical signal 404 and 406 such that the reflections 1102 and 1104 destructively interfere with each other at the input port 403, where the input optical signal 402 enters the directional coupler.

As seen in FIG. 11, the implementation includes a photodiode 1108 that taps or monitors an optical signal at a second input port 1110 of the directional coupler. The photodiode 1108 may produce an electrical signal that indicates a characteristic of the optical signal detected at the second input port 1110 of the directional coupler. The photodiode 1108 may direct the electrical signal to the tuner 1002. The tuner 1002 may analyze the electrical signal from the photodiode 1108 to determine how to adjust the phases of the optical signals 404 and 406 at the output ports 602 and 604 of the directional coupler. For example, the tuner 1002 may adjust the phases of the optical signals 404 and 406 such that the reflections 1102 and 1104 destructively interfere with each other at the first input port 403 and so that the reflections 1102 and 1104 constructively interfere with each other at the second input port 1110 of the directional coupler. As a result, the tuner 1002 adjusts the phases of the optical signals 404 and 406 so that the reflections 1102 and 1104 constructively interfere with each other to form a reflection 1106 at the second input port 1110 of the directional coupler. The reflection 1106 then leaves the directional coupler through the second input port 1110. The photodiode 1108 may monitor the reflection 1106 at the input port 1110 to produce the electrical signal for the tuner 1002. Because the reflections 1102 and 1104 destructively interfere with each other at the first input port 403, the reflections 1102 or 1104 may not travel to an optical source that produced the input optical signal 402. Thus, the tuner 1002 effectively directs the reflections 1102 and 1104 to the input port 1110 rather than the input port 403. As a result, the tuner 1002 may reduce the interference caused by the reflections 1102 and 1104, which may improve link performance in certain embodiments.

Figure 12:
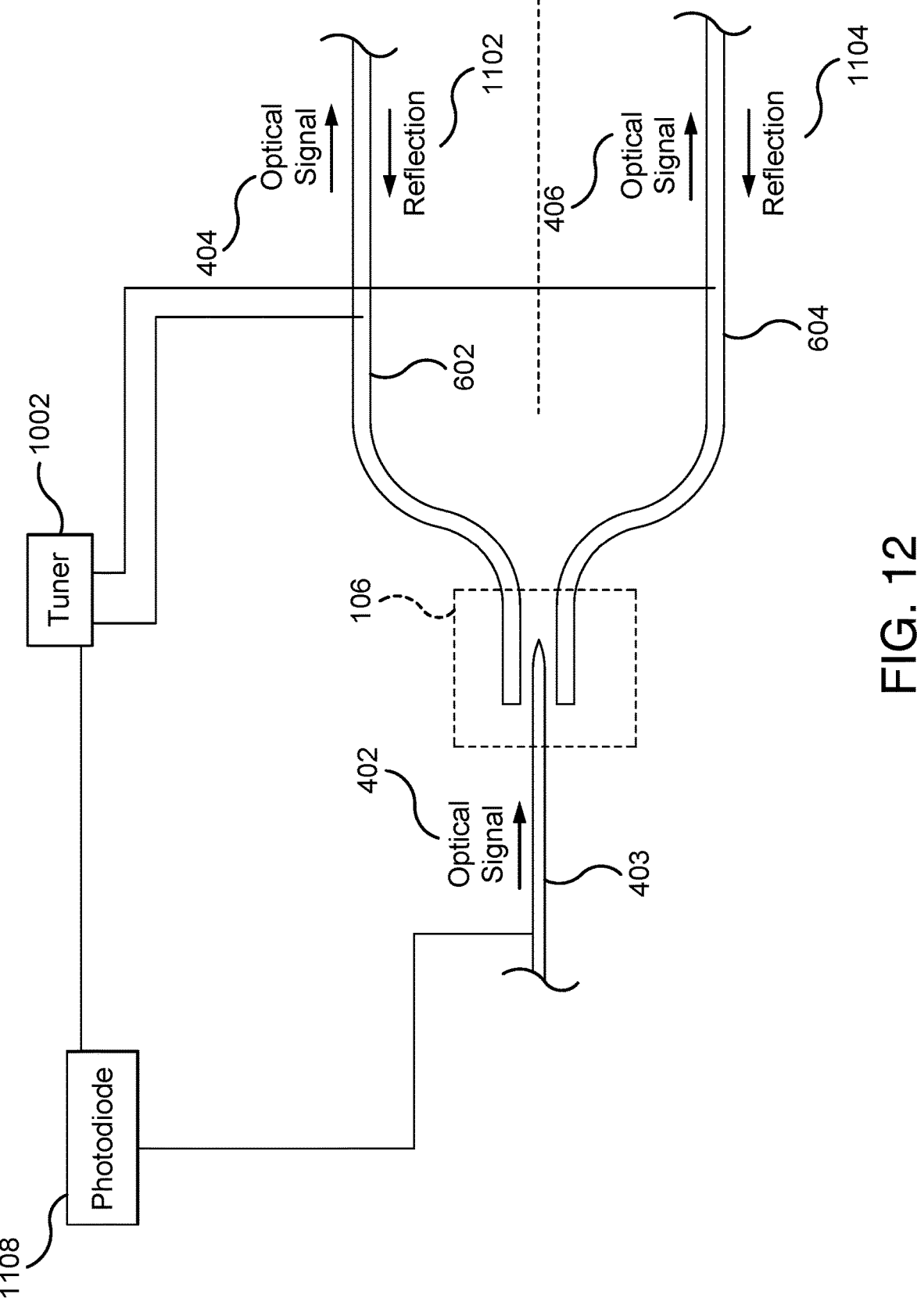
FIG. 12 illustrates an example implementation of the system of FIG. 10.

FIG. 12 illustrates an example implementation of the system 1000 of FIG. 10. For clarity, the substrate 102 and the optical absorber 104 are not illustrated in FIG. 12. In the example of FIG. 12, the optical device 106 is a Y-splitter that splits the input optical signal 402 into the optical signals 404 and 406. As with the previous example, portions of the optical signals 404 and 406 may reflect back into the output ports 602 and 604 Y-splitter formed by two different waveguides. The reflections 1102 and 1104 may travel back towards the Y-splitter and the optical source that generated the input optical signal 402.

The photodiode 1108 may tap or monitor the optical signal at the input port 403 of the Y-splitter. For example, the photodiode 1108 may monitor any reflected signal present at the input port 403. The photodiode 1108 may convert this optical signal into an electrical signal and direct the electrical signal to the tuner 1002. The tuner 1002 may analyze the electrical signal to determine the characteristics of the optical signal present at the input port 403 of the Y-splitter. The tuner 1002 may adjust the phases of the optical signals 404 and 406 such that the reflections 1102 and 1104 destructively interfere with each other at the input port 403 of the Y-splitter. Because the reflections 1102 and 1104 destructively interfere with each other at the input port 403 of the Y-splitter, the reflections 1102 and 1104 may not travel to an optical source that produced the input optical signal 402. As a result, the tuner 1002 reduces the interference caused by the reflections 1102 and 1104, which improves link performance in certain embodiments.

Figure 13:
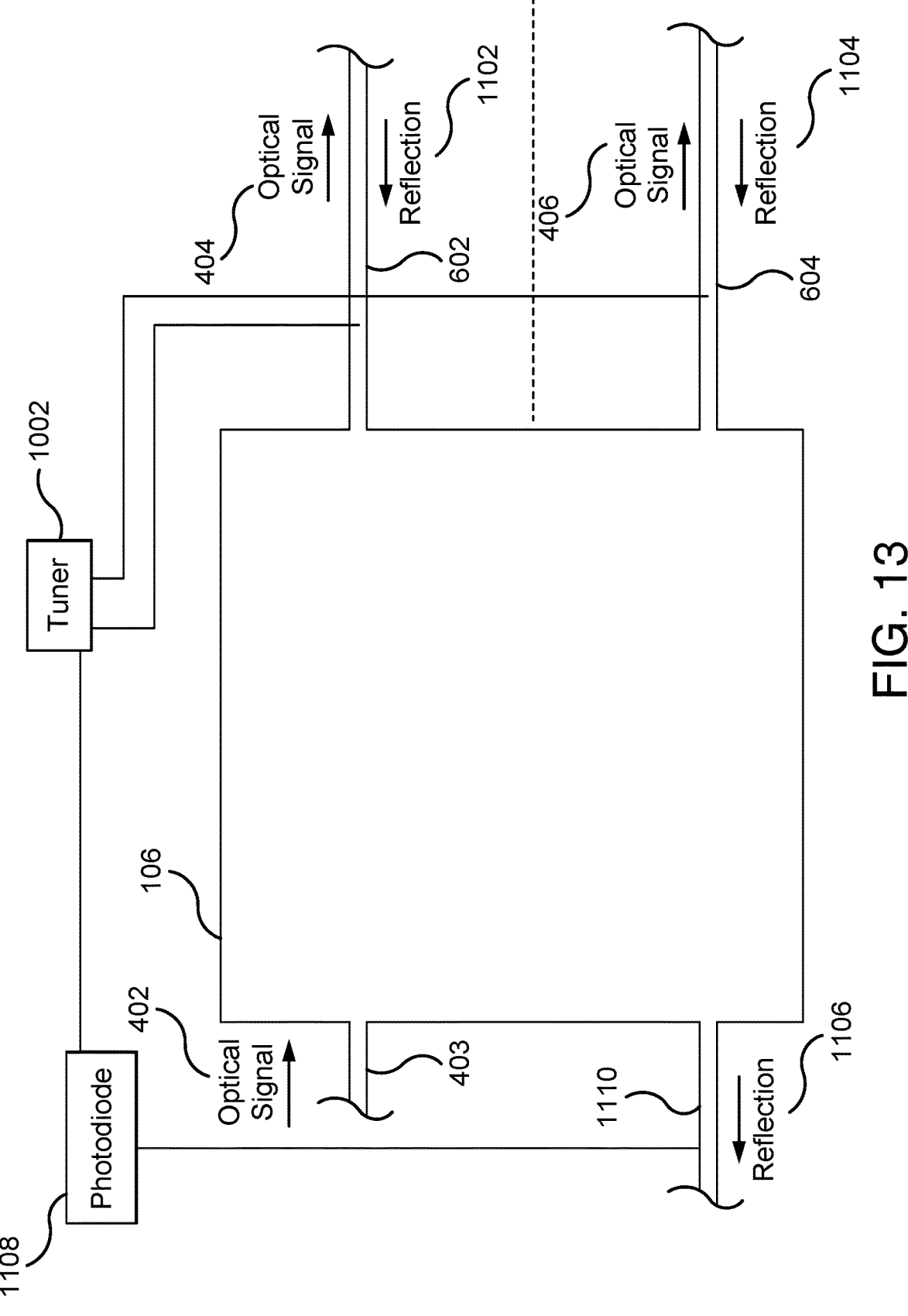
FIG. 13 illustrates an example implementation of the system of FIG. 10.

FIG. 13 illustrates an example implementation of the system 1000 of FIG. 10. For clarity, the substrate 102 and the optical absorber 104 are not illustrated in FIG. 13. In the example of FIG. 13, the optical device 106 is an MMI that produces the optical signals 404 and 406 using the input optical signal 402. The MMI receives the input optical signal 402 at a first input port 403 of the MMI. The MMI then directs the optical signals 404 and 406 through two output ports 602 and 604 of the MMI. Portions of the optical signals 404 and 406 may reflect back into the output ports 602 and 604 of the MMI. As seen in FIG. 13, the reflections 1102 and 1104 are directed back into the MMI through the output ports 602 and 604 formed by two different waveguides.

The photodiode 1108 taps or monitors an optical signal at a second input port 1110 of the MMI. The photodiode 1108 converts the optical signal into an electrical signal and directs the electrical signal to the tuner 1002. The tuner 1002 analyzes the electrical signal and adjusts phases of the optical signals 404 and 406 that causes the reflections 1102 and 1104 to destructively interfere with each other at the first input port 403. Additionally, the phase adjustments may cause the reflections 1102 and 1104 to constructively interfere with each other at the second input port 1110 of the MMI. As seen in FIG. 13, the reflections 1102 and 1104 may constructively interfere with each other to form the reflection 1106 at the second input port 1110 of the MMI. The photodiode 1108 may monitor the reflection 1106 at the input port 1110 of the MMI and produce an electrical signal representing the reflection 1106 for the tuner 1002. Thus, the tuner 1002 effectively directs the reflections 1102 and 1104 to the input port 1110 rather than the input port 403. As a result, the reflections 1102 and 1104 may be prevented from traveling through the first input port 403 to an optical source that generated the optical signal 402, which reduces interference and improves link performance in certain embodiments.

Figure 14:
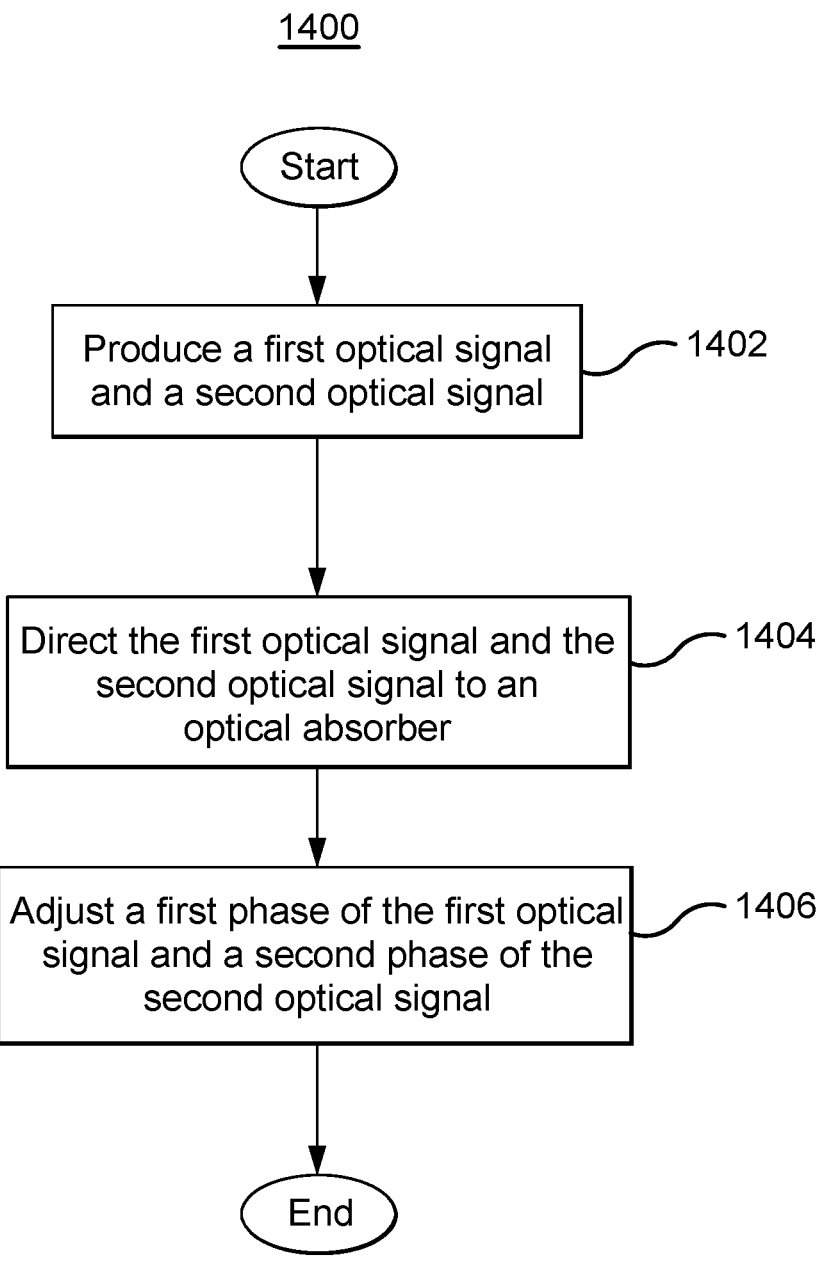
FIG. 14 is a flowchart of an example method performed in the system of FIG. 10.

FIG. 14 is a flowchart of an example method 1400 performed in the system 1000 of FIG. 10. In particular embodiments, the optical device 106 and the tuner 1002 perform the steps of the method 1400. By performing the method 1400, the optical device 106 and the tuner 1002 adjust the phases of the optical signals 404 and 406 to the optical absorber 104 such that the reflections 1102 and 1104 destructively interfere with each other at an input port 403 of the optical device 106 through which the input optical signal 402 is received.

In block 1402, the optical device 106 produces a first optical signal 404 and a second optical signal 406. The optical device 106 may produce the optical signals 404 and 406 using an input optical signal 402. For example, the optical device 106 may be a directional coupler, a Y-splitter, or a MMI that produces the optical signals 404 and 406 using the input optical signal 402.

In block 1404, the optical device 106 may direct the optical signals 404 and 406 to the optical absorber 104. The optical device 106 may direct the optical signals 404 and 406 to different portions of the optical absorber 104. For example, the optical device 106 may direct the optical signals 404 and 406 through the optical ports 602 and 604 of the optical device 106 into different halves of the optical absorber 104. The optical signals 404 and 406 may then pass through the different halves of the optical absorber 104. The optical absorber 104 may reflect back portions of the optical signals 404 and 406 into the optical device 106. For example, the optical signal 404 may produce the reflection 1102 back into the output port 602 of the optical device 106, and the optical signal 406 may produce the reflection 1104 back into the output port 604 of the optical device 106.

At block 1406, the tuner 1002 may adjust a first phase of the optical signal 404 and a second phase of the optical signal 406. The tuner 1002 may rely on an electrical signal from a photodiode 1108 that monitors the reflected optical signal at an input port 403 or 1110 of the optical device 106. The tuner 1002 may adjust the phases of the optical signals 404 and 406 so that the reflections 1102 and 1104 destructively interfere with each other at the input port 403 of the optical device 106 through which the input optical signal 402 is received. In this manner, the tuner 1002 prevents the reflections 1102 and 1104 from traveling back into an optical source that generated the input optical signal 402. As a result, the tuner 1002 reduces or eliminates the interference caused by the reflections 1102 and 1104 at the optical source, which improves link performance in certain embodiments. In some embodiments, the tuner 1002 adjusts the phases of the optical signals 404 and 406 so that the reflections 1102 and 1104 constructively interfere with each other at the input port 1110 of the optical device 106 to form the reflection 1106. The reflection 1106 may then leave the optical device 106 through the input port 1110. In this manner, the tuner 1002 effectively directs the reflections 1102 and 1104 to the input port 1110 rather than the input port 403.

In summary, the optical device 106 produces two optical signals 404 and 406 from a received optical signal 402. The optical device 106 then couples the two optical signals 404 and 406 into the two different portions of the optical absorber 104. In this manner, the two optical signals 404 and 406 are directed through the optical absorber 104 but away from the metal contacts 206 along a line (e.g., a midline 208) and on the top surface of the optical absorber 104. As a result, the metal contacts 206 interfere less with the optical signals 404 and 406 passing through the optical absorber 104, which reduces responsivity loss in certain embodiments.

In some embodiments, the tuner 1002 is included to adjust the phases of the two optical signals 404 and 406 entering the optical absorber 104. The optical device 106 may receive an input optical signal 402 at an input port 403 and produce the two optical signals 404 and 406 from the input optical signal 402. The tuner 1002 may adjust the phases of the two optical signals 404 and 406 so that the reflected signals 1102 and 1104 from the optical absorber 104 destructively interfere with each other at the input port 403. In this manner, the interference at the input port 403 caused by the reflected signals 1102 and 1104 is reduced, which improves link performance in certain embodiments.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. An apparatus comprising:

a substrate;

an optical absorber comprising a top surface and a bottom surface opposite the top surface, wherein the optical absorber is positioned on the substrate such that the bottom surface is positioned between the substrate and the top surface, and wherein the optical absorber comprises a first portion and a second portion coupled to the first portion along a line such that the first portion is positioned on a first side of the line and the second portion is positioned on a second side of the line different from the first side;

a first set of metal contacts positioned on the top surface such that the first set of metal contacts is arranged along the line;

an optical device arranged to:

produce a first optical signal and a second optical signal based on a received optical signal;

direct the first optical signal through the first portion of the optical absorber in a direction substantially parallel to the line such that the first optical signal passes through the optical absorber on the first side of the first set of metal contacts; and direct the second optical signal through the second portion of the optical absorber in the direction substantially parallel to the line such that the second optical signal passes through the optical absorber on the second side of the first set of metal contacts.

2. The apparatus of claim 1, further comprising:

a second set of metal contacts arranged on the substrate; and a third set of metal contacts arranged on the substrate, wherein the second set of metal contacts and the third set of metal contacts are arranged on opposite sides of the optical absorber.

3. The apparatus of claim 1, wherein the optical device is at least one of a directional coupler, a y-splitter, or a multi-mode interferometer.

4. The apparatus of claim 1, wherein the optical device abuts the optical absorber.

5. The apparatus of claim 1, wherein the optical device abuts the substrate.

6. The apparatus of claim 1, wherein the substrate comprises a first doped region and a second doped region, and wherein the first doped region and the second doped region extend beneath the optical absorber.

7. The apparatus of claim 6, wherein the substrate comprises an intrinsic region positioned beneath the optical absorber and between the first doped region and the second doped region.

8. The apparatus of claim 1, wherein the optical device is further arranged to:

introduce a first phase shift to the first optical signal before directing the first optical signal through the first portion of the optical absorber; and introduce a second phase shift to the second optical signal before directing the second optical signal through the second portion of the optical absorber.

9. A method comprising:

producing, by an optical device, a first optical signal and a second optical signal based on a received optical signal;

directing the first optical signal through a first portion of an optical absorber in a direction substantially parallel to a line, wherein the optical absorber comprises a top surface and a bottom surface opposite the top surface, wherein a first set of metal contacts is positioned on the top surface such that the first set of metal contacts is arranged along the line; and directing the second optical signal through a second portion of the optical absorber in the direction substantially parallel to the line, wherein the second portion is coupled to the first portion along the line such that the first portion is positioned on a first side of the line and the second portion is positioned on a second side of the line different from the first side, wherein the first optical signal passes through the optical absorber on the first side of the first set of metal contacts, and wherein the second optical signal passes through the optical absorber on the second side of the first set of metal contacts.

10. The method of claim 9, wherein the optical absorber further comprises:

a second set of metal contacts arranged; and a third set of metal contacts arranged, wherein the second set of metal contacts and the third set of metal contacts are arranged on opposite sides of the optical absorber.

11. The method of claim 9, wherein the optical device is at least one of a directional coupler, a y-splitter, or a multi-mode interferometer.

12. The method of claim 9, wherein the optical device abuts the optical absorber.

13. The method of claim 9, wherein the optical absorber is positioned on a substrate, and wherein the optical device abuts the substrate.

14. The method of claim 9, wherein the optical absorber is positioned on a substrate comprising a first doped region and a second doped region, and wherein the first doped region and the second doped region extend beneath the optical absorber.

15. The method of claim 14, wherein the substrate comprises an intrinsic region positioned beneath the optical absorber and between the first doped region and the second doped region.

16. The method of claim 9, further comprising:

introducing a first phase shift to the first optical signal before directing the first optical signal through the first portion of the optical absorber; and introducing a second phase shift to the second optical signal before directing the second optical signal through the second portion of the optical absorber.

17. An apparatus comprising:

an optical absorber comprising a top surface, a bottom surface opposite the top surface, a first set of metal contacts arranged along a first side of the optical absorber, a second set of metal contacts arranged along 5 a second side of the optical absorber opposite the first side, and a third set of metal contacts arranged on the top surface along a line;

an optical device arranged to:

produce a first optical signal and a second optical 10 signal;

direct the first optical signal through a first portion of the optical absorber between the first set of metal contacts and the third set of metal contacts on a first side of the first set of metal contacts in a direction 15 substantially parallel to the line; and direct the second optical signal through a second portion of the optical absorber between the second set of metal contacts and the third set of metal contacts on a second side of the first set of metal contacts 20 different from the first side in the direction substantially parallel to the line.

18. The apparatus of claim 17, wherein the first and second sets of metal contacts are arranged in the direction parallel to the line. 25

* * * * *